(12) United States Patent
Cross

(10) Patent No.: US 10,864,841 B1
(45) Date of Patent: Dec. 15, 2020

(54) SYSTEM AND METHOD FOR TYING DOWN AN OBJECT

(71) Applicant: Myron Cross, Jacksonville, NC (US)

(72) Inventor: Myron Cross, Jacksonville, NC (US)

( * ) Notice: Subject to any disclaimer, the term of this patent is extended or adjusted under 35 U.S.C. 154(b) by 0 days.

(21) Appl. No.: 16/583,635

(22) Filed: Sep. 26, 2019

Related U.S. Application Data

(60) Provisional application No. 62/902,576, filed on Sep. 19, 2019.

(51) Int. Cl.
*B60P 7/08* (2006.01)
*B60P 3/079* (2006.01)

(52) U.S. Cl.
CPC .............. *B60P 3/079* (2013.01); *B60P 7/0807* (2013.01)

(58) Field of Classification Search
CPC ........ B60P 3/079; B60P 7/0807; B63B 21/04; B63B 21/045; Y10T 24/3916; F16G 11/14; F16G 11/146; F16G 11/143
USPC ..... 410/98, 102, 106, 110, 116, 97, 96, 100; 24/115 K, 265 CD, 129 R, 130; 114/218
See application file for complete search history.

(56) References Cited

U.S. PATENT DOCUMENTS

| | | | | |
|---|---|---|---|---|
| 6,059,498 A | * | 5/2000 | Ostrowski | B60P 7/08 410/100 |
| 6,129,490 A | * | 10/2000 | Erskine et al. | B60P 7/08 410/110 |
| 7,578,646 B2 | * | 8/2009 | Shaw | B60P 3/079 410/123 |

* cited by examiner

*Primary Examiner* — Stephen T Gordon
(74) *Attorney, Agent, or Firm* — Coats & Bennett PLLC

(57) ABSTRACT

Disclosed herein is a system and method for tying down an object that employs one or more tie downs. Each tie down includes a flexible connector having first and second end portions and a floating cleat. When the object is properly tied down, the flexible connector and the floating cleat are suspended between the object and an anchor point.

4 Claims, 6 Drawing Sheets

SYSTEM AND METHOD FOR TYING DOWN AN OBJECT

CROSS-REFERENCE TO RELATED APPLICATION

This application claims priority under 35 U.S.C. § 119(e) from the following U.S. provisional application: Application Ser. No. 62/902,576 filed on Sep. 19, 2019. That application is incorporated in its entirety by reference herein.

FIELD OF THE INVENTION

The present invention relates to tie downs used to station and secure objects and structures.

BACKGROUND OF THE INVENTION

Many people have experienced the difficulties and frustrations that come with attempting to tie down an object, such as a lawnmower, on a trailer or a load bed of a truck. The problem is that of securely stationing the object such that it does not move as a trailer or truck moves over roadways, paths and even rough terrain. Simply attaching a rope to the object and then connecting the rope to the trailer or load bed of a truck will not always firmly station the object. In many cases, it is difficult to find convenient and suitable connecting points on the trailer or load bed. Other times, one finds that the connection to the object is rather loose—not tight—and as a consequence, the object is not securely stationed and tends to move around on the trailer or truck as the trailer or truck traverses roadways, etc. Moreover, the knots that are used with conventional tie downs are often difficult to untie, especially if they are wet or cold.

Therefore, there has been and continues to be a need for a tie down system and method that addresses these problems and other shortcomings of conventional tie down systems and methods.

SUMMARY OF THE INVENTION

The present invention includes a system and method for tying down an object that employs one or more tie downs, each including a flexible connector (such as a rope) having first and second end portions and a floating cleat. When the object is properly tied down, the flexible connector and the floating cleat are suspended between the object and an anchor point.

In one example, the flexible connector is tied to the floating cleat and the floating cleat in turn includes a hook that is secured to the anchor point. In another example, one portion of the flexible connector is secured to an eyelet of the floating cleat and then secured to the anchor point while another portion of the flexible connector is secured to the object and thereafter is tied to the floating cleat via a knot such as, for example, a cleat hitch knot.

The present invention in another embodiment comprises a floating cleat and flexible connector assembly that is secured to at least one object. The floating cleat and flexible connector assembly comprises a floating cleat including a central section, two ears and an elongated base having a first eyelet disposed on one end and a second eyelet or hook disposed on the other end. A flexible connector is secured to the object and extends therefrom to the floating cleat. The flexible connector is connected to at least one of the first and second eyelets and also extends through at least one of the first and second eyelets after which the flexible connector is tied in a knot that extends around the central section and the ears of the floating cleat. The floating cleat of the assembly is suspended in air and not anchored to a structure.

Other objects and advantages of the present invention will become apparent and obvious from a study of the following description and the accompanying drawings which are merely illustrative of such invention.

DESCRIPTION OF EXEMPLARY EMBODIMENTS

Figure 1:
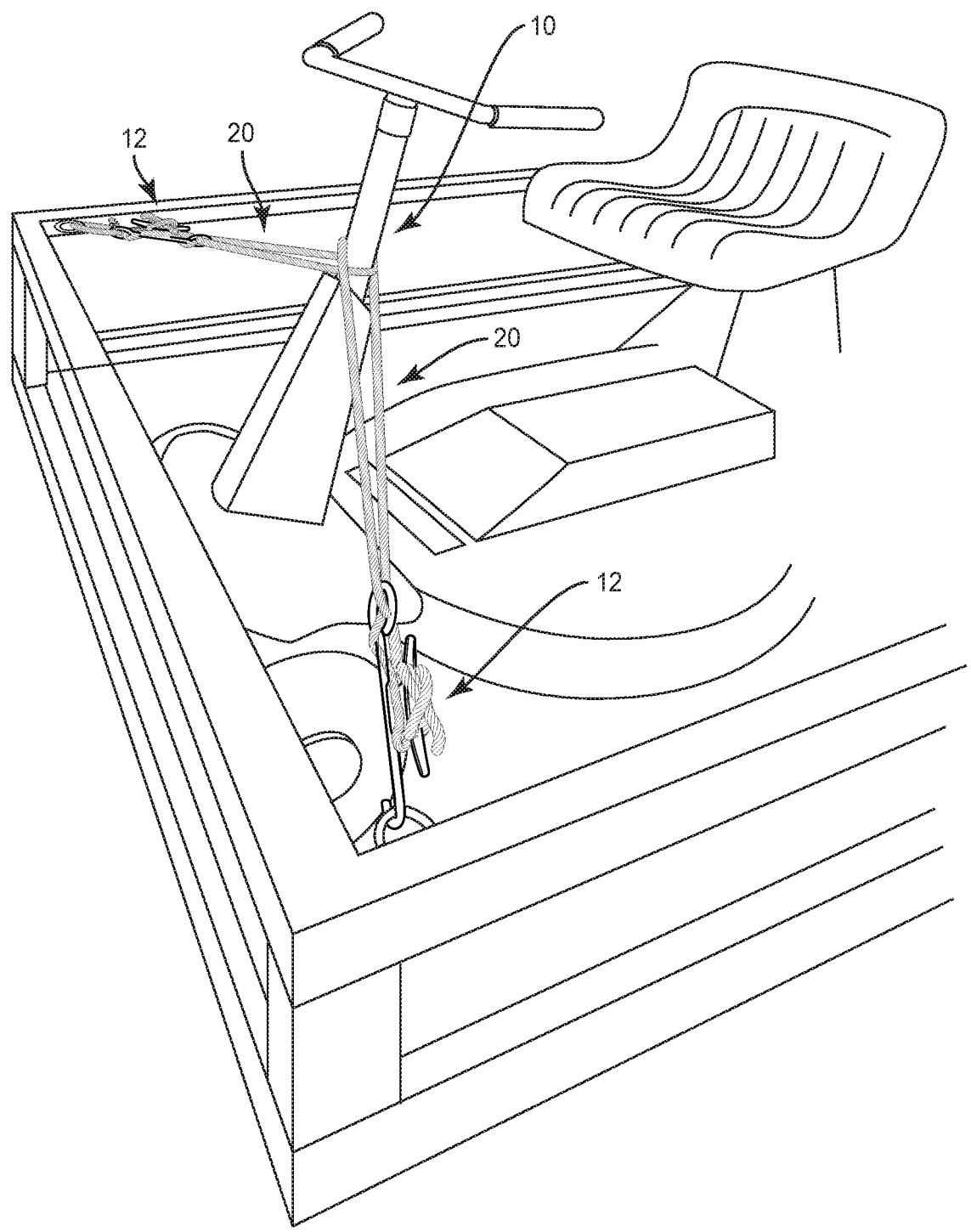
FIG. 1 is an illustration showing a pair of tie downs securing a lawn mower on a trailer or load bed.

With further reference to FIG. 1, an object 10, such as a lawn mower, is shown secured on a surface, such as a trailer or load bed of a truck. Two tie downs, each indicated generally by the numeral 12, are secured to the object 10 and project therefrom where they are secured to anchor points 40. In this example, the tie downs 12 are secured to the object and project from opposite sides. Tie downs 12 extend to respective anchor points on a trailer, load bed or other structure. When the object 10 is properly tied down, the tie downs 12 are pulled tight and securely tied. Preferably, in these embodiments the tie downs 12 will be under tension. Since the tie downs 12 extend from opposite sides of the object 10, then it follows that the object is prevented from moving.

The example of FIG. 1 is one way of tying down an object with a pair of tie downs 12. People skilled in the art appreciate and understand that the tie down 12 can be employed in various configurations to tie down an object. For example, a single tie down 12 can be used in certain situations to tie down an object. In other examples, more than two tie downs can be employed to secure an object.

It will be beneficial to review the basic structure of the tie down 12. Tie down 12 includes a flexible connector 20, such as a rope, cord or the like. See FIGS. 4-5. Flexible connector 20 includes opposite ends, as well as first and second end portions. An end portion of the flexible connector 20 extends from a terminal end to an intermediate point on the connector. Further, tie down 12 includes a floating cleat indicated generally by the numeral 22. The term "floating cleat" means that the cleat is not anchored directly to a structure but when forming a part of a tie down tends, in some cases at least, to be suspended in the air and not fixed to a structure.

Figure 2:
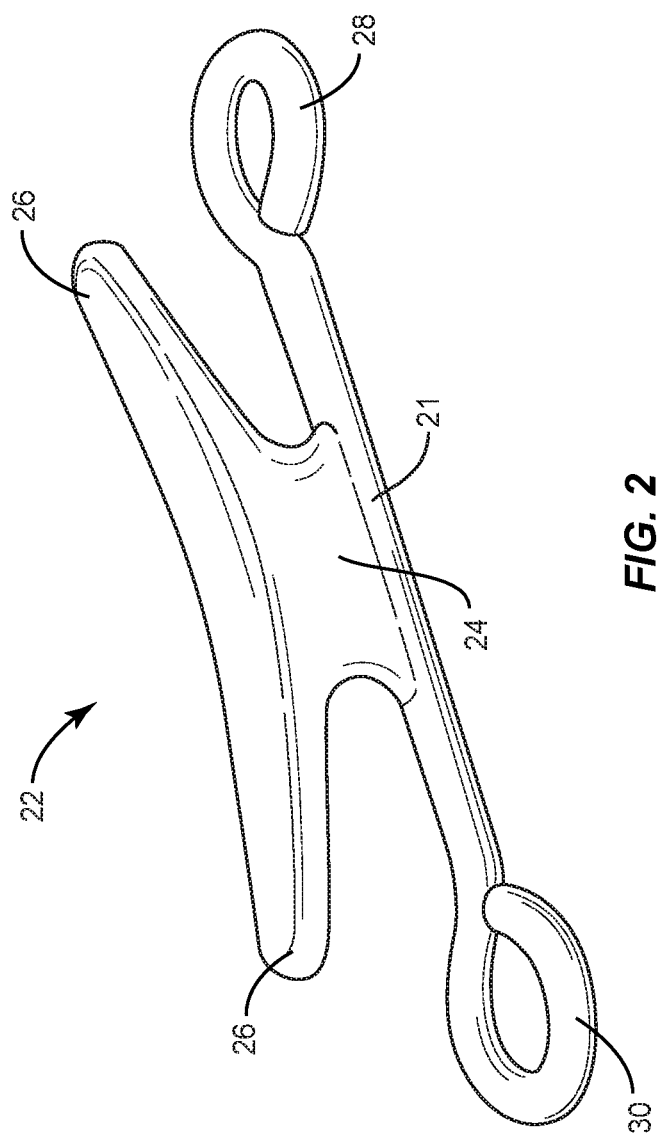
FIG. 2 is a perspective view of a first embodiment of a floating cleat that forms a part of the tie down.

Floating cleat 22 includes a base 21 and central section 24. A pair of ears 26 project from opposite ends of the central section 24. In one embodiment (see FIG. 2), the floating cleat 22 includes first and second eyelets 28 and 30 disposed on opposite ends of the base 21. Note that the eyelets 28 and 30 are spaced apart and are generally aligned. In a second embodiment (see FIG. 3), the floating cleat 22 includes a first eyelet 28 and a hook 30A. Note that the first eyelet 28 and the hook 30A are spaced apart but are generally aligned.

Figure 3:
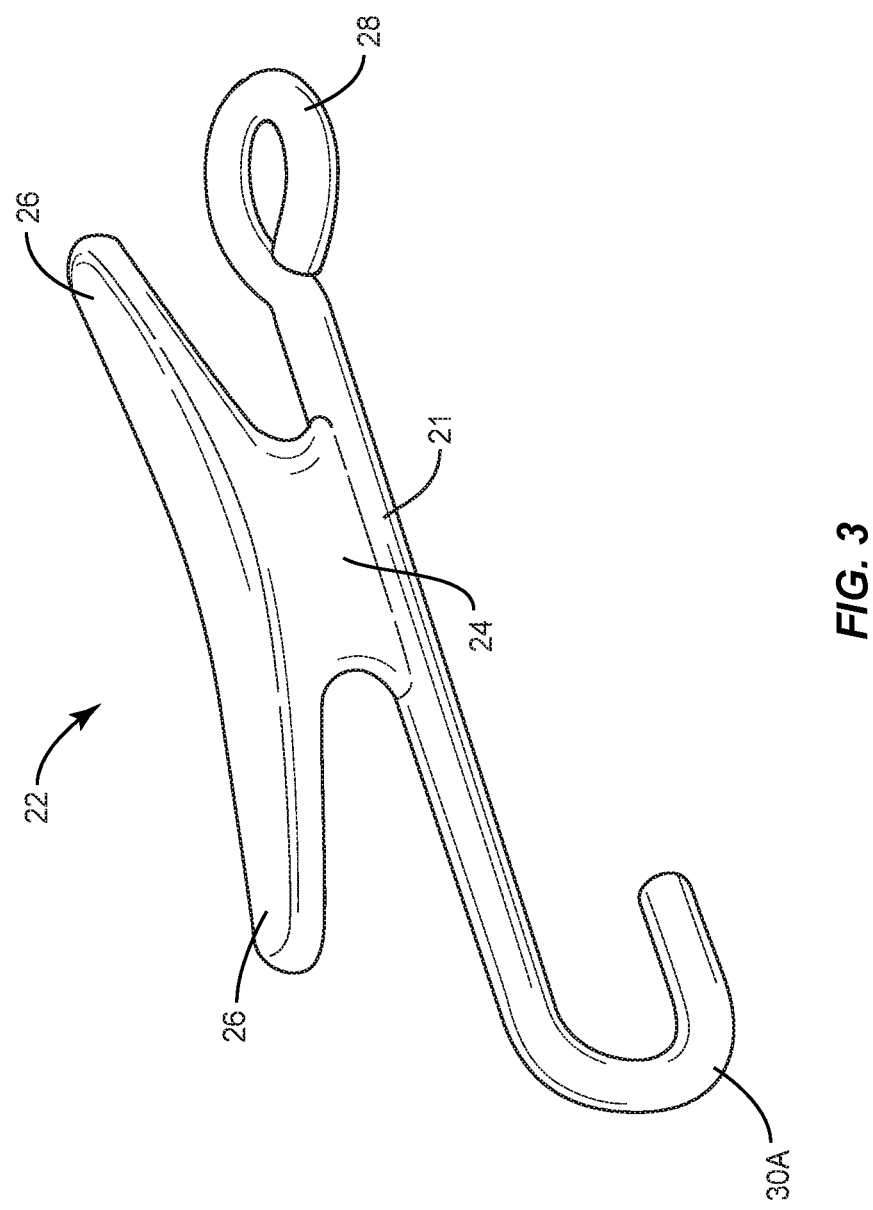
FIG. 3 is a perspective view of a second embodiment of the floating cleat that forms a part of a tie down.
Figure 4:
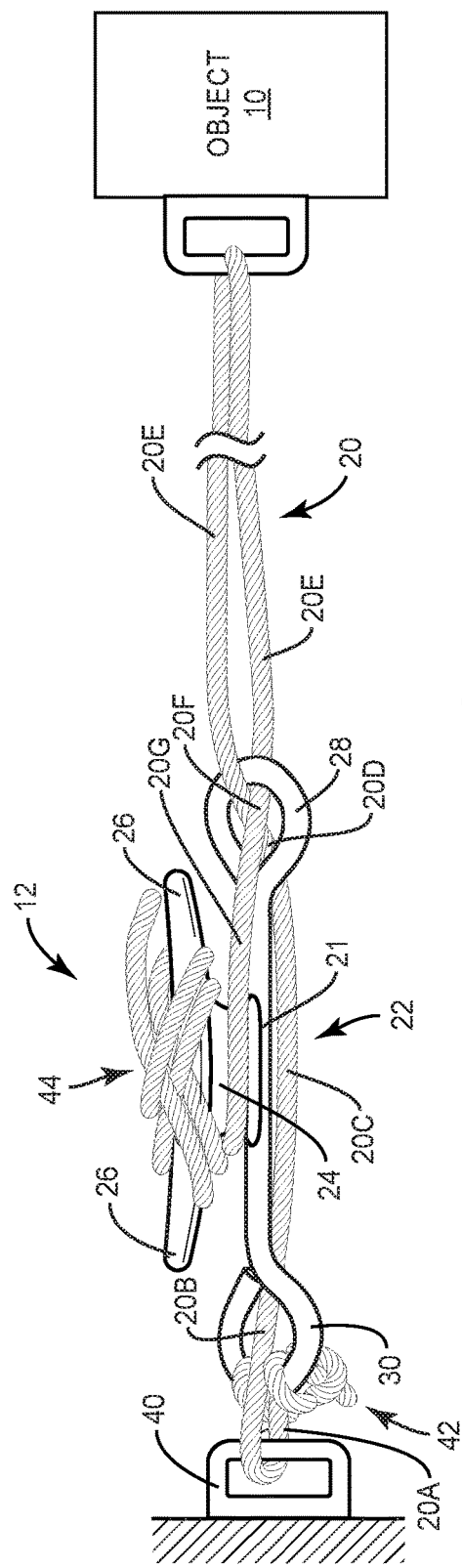
FIG. 4 illustrates the use of a tie down employing the floating cleat shown in FIG. 2.
Figure 5:
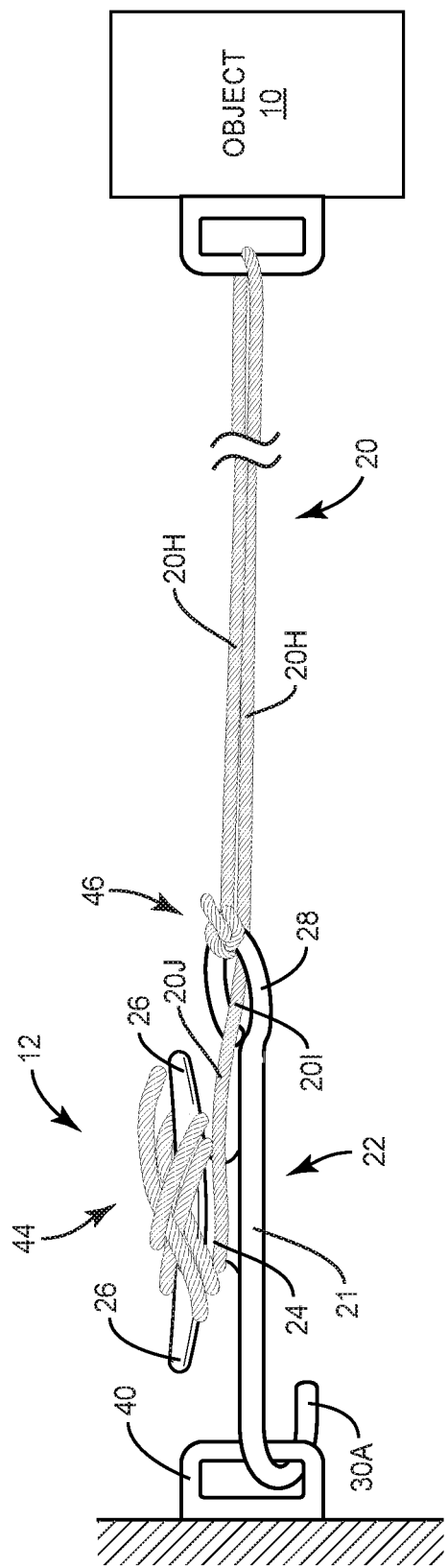
FIG. 5 illustrates the employment of a tie down that incorporates the floating cleat of FIG. 3.

As noted above, there are two embodiments of the floating cleat 22. First, there is the embodiment shown in FIG. 2. In this embodiment, the floating cleat 22 includes two spaced apart but aligned eyelets 28 and 30. The second embodiment of the floating cleat 22 is shown in FIG. 3. The cleat shown in FIG. 3 is similar to that shown in FIG. 2. However in this case, there is only one eyelet 28 and there is provided a hook 30A that projects from the end of the floating cleat 22 opposite the eyelet. Because of this slight difference in structure in the two embodiments of the floating cleat 22, the floating cleat will interface with the anchor point 40 and the flexible connector 20 in different ways. This is particularly illustrated in FIGS. 4 and 5. Note that FIGS. 4 and 5 are schematic illustration showing the tie down 12 connected between an anchor point 40 and the object 10, which in this case is simply represented by a box. As discussed above, FIGS. 4 and 5 illustrate how the respective floating cleats 22 interface with the flexible connector 20 and the anchor point 40.

Flexible connector 20 can be secured to the floating cleat 22 by various knot configurations. As discussed here, two types of knots are used to secure the flexible connector 20 to the floating cleat 22. These two knots are generally known as a bowline knot and a cleat hitch knot. People ordinarily skilled in the art understand and appreciate how a bowline knot and a cleat hitch knot is made and configured. It is also understood and appreciated by those skilled in the art that various types of knots can be employed to secure the flexible connector 20 to the floating cleat 22.

Figure 4A:
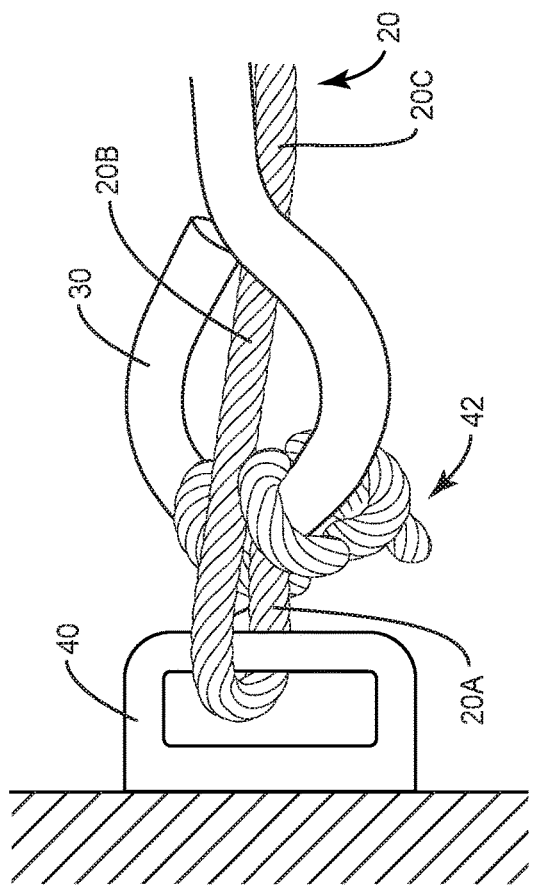
FIG. 4A is an enlarged view showing how a flexible connector (rope) is secured to an eyelet of the floating cleat and looped around an adjacent anchor point.

Described herein are two embodiments for the tie down 12, the embodiment shown in FIGS. 4 and 4A and the embodiment shown in FIG. 5. Generally in the case of the tie down shown in FIGS. 4 and 4A, the flexible connector 20 extends between the object 10 and the anchor point 40. One end of the flexible connector 20 is tied (for example, by a bow line knot) to eyelet 30 while an opposite end portion of the flexible connector 20 is tied (by, for example, a cleat hitch knot) to the floating cleat 22. Note in FIG. 4 where the floating cleat is effectively suspended and supported by the flexible connector 20.

In the case of the FIG. 5 embodiment of the tie down 12, the hook 30A is secured to the anchor point 40. One end of the flexible connector is tied to the first eyelet 28. An opposite end portion of the flexible connector 20 is tied (by a cleat hitch knot, for example), to the floating cleat 22. See FIG. 5. In the case of the FIG. 5 embodiment, the floating cleat 22 is designed to be directly secured via the hook 30A to the anchor point 40.

With particular reference to FIGS. 4 and 4A, a description of how the tie down 12 is employed to secure the object 10 will follow. In this case, a first end of the flexible connector 20 is tied to the second eyelet 30. In particular, a bowline or other suitable knot, indicated generally by the numeral 42 in FIG. 4, is utilized to tie one end of the flexible connector 20 to the eyelet 30. See FIG. 4A. A segment 20A is extended from the bowline or other suitable knot 42 to the anchor point 40 and looped around the anchor point. From the anchor point 40, a portion of the flexible connector 20B is threaded back through the eyelet 30 and from there a portion 20C of the flexible connector is extended generally along the lower portion of the floating cleat 22 as viewed in FIG. 4. Then a portion 20D is threaded through the first eyelet 28. From the first eyelet 28 a portion 20E is extended to the object 10 and appropriately secured thereto and the same portion 20E is directed back towards the first eyelet 28. At this point, a portion 20F is threaded back through the first eyelet 28 and from there a portion 20G is extended to the central portion 24 of the floating cleat 22. Now the portion 20G can be pulled longitudinally, as viewed in FIG. 4, to effectively cinch and tighten the flexible connector 20 as it is secured around the upper portion of the floating cleat as viewed in FIG. 4. In the exemplary embodiment shown herein, a cleat hitch knot indicated generally by the numeral 44 is employed to secure this end portion of the flexible connector 20 to the floating cleat 22. Again, it is appreciated that other types and forms of knots can be used here. Thus, in this embodiment of the tie down 12, the floating cleat 22 is not secured directly to either the object 10 or the anchor point 40. Instead, it is suspended in air between the object 10 and the anchor point 40 as the flexible connector 20 is directly connected to the floating cleat 22.

Now turning to the FIG. 5 embodiment, the hook 30A is secured to the anchor point 40 and one end of the flexible connector 20 is tied to the first eyelet 28 by an appropriate knot indicated generally by the numeral 46. Again, various types of knots can be used here. Extending from the knot is a flexible connector portion 20H that is extended to the object 10 and secured to the object and looped back to the first eyelet 28. Here a portion 20I is threaded through the first eyelet 28. From the first eyelet 28, a portion of 20J extends towards the central section 24 of the floating cleat 22. Portion 20J of the flexible connector 20 can be cinched and tightened by pulling the same from right to left as viewed in FIG. 5. Once the flexible connector 20 has been sufficiently tensioned, then an end portion of the flexible connector is wrapped around the central portion 24 and the ears 26 to form a secure knot. Again, in this case the knot illustrated is what is referred to as a cleat hitch knot 44. But again, other types of knots can be used here. Thus, in the case of the FIG. 5 embodiment, it is seen that the tie down is employed such that the floating cleat 22 via the hook 30A is directly connected to the anchor point 40 while one end of the flexible connector is secured to the first eyelet 28 and the opposite end portion is secured with a cleat hitch to the floating cleat 22, as shown in FIG. 5, in order to secure the object 10 in place.

Figure 6:
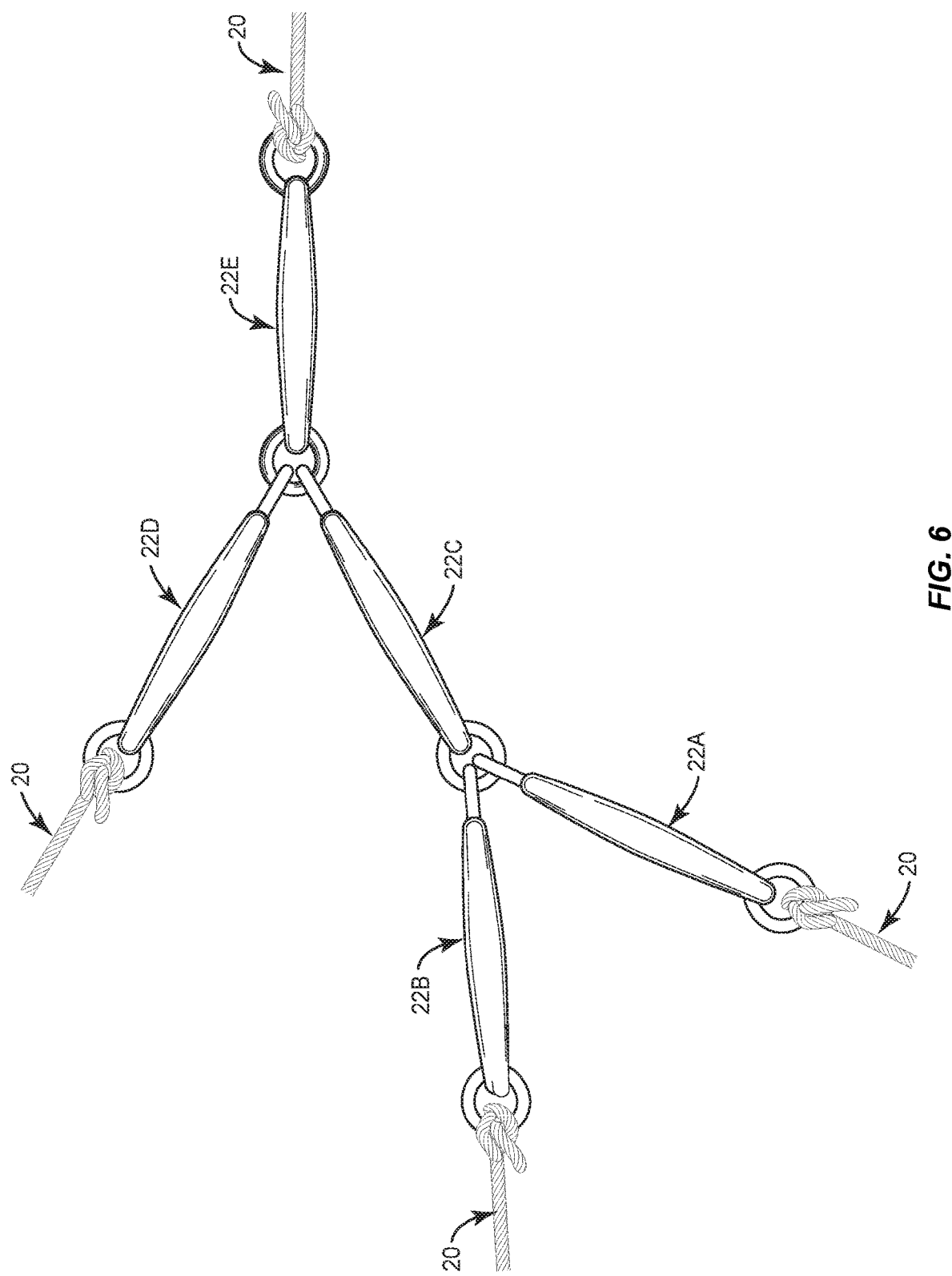
FIG. 6 illustrates a series of floating cleats secured together to form a tie down.

FIG. 6 shows an example of how multiple floating cleats 22 can be ganged together to form a tie down where multiple anchor points are employed for securing an object. Note that in this example two floating cleats 22A and 22B are connected to a third floating cleat 22C. Floating cleat 22D, as well as floating cleat 22C, is secured to a fifth floating cleat 22E. In this case, the flexible connector 20 extending from floating cleats 22A, 22B and 22D extend to anchor points. The flexible connector 20 extending from floating cleat 22E is directed to the object where it is appropriately tied or secured.

There are many advantages of the tie down 12 and to the method of tying down an object described herein. First, the effective length of the tie down 12 is adjustable. It can be used for any spans. The tie down is simple and easy to use. No special tools are required to tension the tie down 12. Further, when employed as described, the floating cleat is held tight and there is no slippage between the floating cleat and the actual tie that is connected to the body of the floating cleat. Furthermore, the tie downs described do not fray or unusually fray or wear the rope or flexible connector.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of securing an object in a location, comprising:
   securing one or more tie downs to the object and extending the tie down from the object towards an anchor point and connecting the tie down to the anchor point;
   the tie down including a flexible connector having a first end and a second end portion and a floating cleat having a central section, a pair of ears, and first and second eyelets or a first eyelet and a hook;
   wherein securing the tie down to an anchor point comprises:
   i. tying the first end of the flexible connector to the second eyelet of the floating cleat and extending the flexible connector from the second eyelet to the anchor point and securing the flexible connector to the anchor point and thereafter extending the flexible connector from the anchor point through the first and second eyelets and from the first and second eyelets extending the flexible connector to the object and connecting the flexible connector to the object and thereafter extending the flexible connector from the object through the first eyelet and from the first eyelet extending the flexible connector to the central section of the floating cleat and tying the second end portion of the flexible connector around the ears of the floating cleat; or
   ii. directly connecting the hook of the floating cleat to the anchor point and connecting the first end of the flexible connector to the first eyelet and thereafter extending the flexible connector from the first eyelet to the object and securing the flexible connector to the object and thereafter extending the flexible connector from the object through the first eyelet and to the central section of the floating cleat and securing the second end portion of the flexible connector to the floating cleat.

2. The method of claim 1 wherein the first and second eyelets of the floating cleat are spaced apart and generally aligned.

3. The method of claim 1 wherein the second end portion of the flexible connector is secured to the floating cleat via a half hitch or other suitable knot.

4. The method of claim 1 wherein the floating cleat is at least partially suspended in air by the flexible connector.

* * * * *